United States Patent
Moore

(10) Patent No.: US 9,072,953 B2
(45) Date of Patent: Jul. 7, 2015

(54) PITCHING DEVICE AND METHOD FOR BASEBALL AND SOFTBALL SPORTS

(71) Applicant: Darrell J Moore, Everett, WA (US)

(72) Inventor: Darrell J Moore, Everett, WA (US)

(*) Notice: Subject to any disclaimer, the term of this patent is extended or adjusted under 35 U.S.C. 154(b) by 67 days.

(21) Appl. No.: 13/775,246

(22) Filed: Feb. 24, 2013

(65) Prior Publication Data

US 2013/0157788 A1    Jun. 20, 2013

Related U.S. Application Data

(60) Provisional application No. 61/686,987, filed on Apr. 16, 2012.

(51) Int. Cl.
| | | |
|---|---|---|
| A63B 69/00 | (2006.01) | |
| A63B 63/00 | (2006.01) | |
| A63B 71/06 | (2006.01) | |

(52) U.S. Cl.
CPC .......... *A63B 63/00* (2013.01); *A63B 2069/0006* (2013.01); *A63B 2071/0694* (2013.01)

(58) Field of Classification Search
CPC ........... A63B 69/0002; A63B 69/0006; A63B 63/00; A63B 71/022; A63B 2063/00
USPC .......... 473/422, 417, 454–456, 434, 435, 451; D21/780, 699
See application file for complete search history.

(56) References Cited

U.S. PATENT DOCUMENTS

| | | | | |
|---|---|---|---|---|
| 289,032 | A | * | 11/1883 | Sears ........................... 273/409 |
| 1,511,430 | A | | 10/1924 | Schonberg |
| 1,567,384 | A | * | 12/1925 | Rectenwald et al. ......... 473/456 |
| 1,703,672 | A | * | 2/1929 | Housden ....................... 473/190 |
| 2,040,228 | A | * | 5/1936 | Whiteley ...................... 273/376 |
| 2,251,305 | A | * | 8/1941 | Tarbox .......................... 273/371 |
| 2,591,016 | A | * | 4/1952 | Schoenherr ................... 473/569 |
| 3,229,975 | A | | 1/1966 | Tompkins et al. |
| 3,312,467 | A | | 4/1967 | Dawson |
| 3,583,703 | A | | 6/1971 | Brown et al. |
| 4,173,337 | A | | 11/1979 | Okonowski |
| 4,199,141 | A | * | 4/1980 | Garcia .......................... 473/455 |
| 4,210,326 | A | | 7/1980 | Booth et al. |
| 4,254,952 | A | | 3/1981 | Playter, Jr. |
| 4,473,227 | A | | 9/1984 | Klaus |
| 4,563,005 | A | * | 1/1986 | Hand et al. .................... 473/455 |
| 4,629,188 | A | | 12/1986 | Mahieu |

(Continued)

FOREIGN PATENT DOCUMENTS

| | | | | |
|---|---|---|---|---|
| FR | 2619509 A1 | * | 2/1989 | ............. A63B 67/14 |
| FR | 2706998 A3 | * | 12/1994 | ................ A63F 9/02 |
| GB | 2279137 A | * | 12/1994 | ................ F41J 1/00 |

*Primary Examiner* — Mitra Aryanpour
(74) *Attorney, Agent, or Firm* — Stan Sastry

(57) ABSTRACT

Embodiments of a baseball or softball pitching and training device and methods of teaching a student pitcher the art of intelligent pitching are disclosed. An embodiment of a device comprises a vertically planar display surface having an image and dimensions of an average strike zone, the display surface further comprising, a plurality of areas of generally rectangular target shapes for receiving pitched balls; the generally rectangular target shapes indicating graded locations of effectiveness of pitches; and the device furthermore comprising, pitch location information, which is controlled by pitch count of "balls" and "strikes". Furthermore, an embodiment of a method includes the steps of (1) providing the device disclosed above; and (2) providing pitch location and pitch selection information, which are controlled by pitch count of "balls" and "strikes".

18 Claims, 12 Drawing Sheets

(56) References Cited

U.S. PATENT DOCUMENTS

| | | | |
|---|---|---|---|
| 4,643,423 A * | 2/1987 | Wright | 473/456 |
| 4,657,250 A * | 4/1987 | Newland et al. | 473/432 |
| 4,768,784 A | 9/1988 | Wilson | |
| 4,826,164 A | 5/1989 | Butcher | |
| 4,830,369 A * | 5/1989 | Poitras | 473/455 |
| 4,872,674 A * | 10/1989 | Deal | 473/435 |
| 4,872,675 A | 10/1989 | Crowden | |
| 4,913,427 A | 4/1990 | Wilson | |
| 4,930,774 A | 6/1990 | Butcher | |
| 4,955,607 A | 9/1990 | Maye | |
| 5,046,729 A * | 9/1991 | Yancey | 473/455 |
| 5,064,194 A * | 11/1991 | Bixler et al. | 473/436 |
| D322,288 S | 12/1991 | Coleman | |
| 5,083,774 A | 1/1992 | Yalvac | |
| 5,097,985 A | 3/1992 | Jones | |
| D331,426 S | 12/1992 | Riffle et al. | |
| D333,856 S | 3/1993 | Cantey | |
| 5,333,855 A | 8/1994 | Silin et al. | |
| 5,439,211 A * | 8/1995 | Drabowsky | 473/456 |
| 5,704,855 A | 1/1998 | Kellogg, Jr. | |
| 5,820,496 A * | 10/1998 | Bergeron | 473/455 |
| 6,350,211 B1 | 2/2002 | Kolmar | |
| 6,837,809 B2 * | 1/2005 | Majumdar | 473/454 |
| 6,878,078 B2 * | 4/2005 | Swanson | 473/454 |
| D509,872 S * | 9/2005 | Alberti | D21/780 |
| D597,155 S * | 7/2009 | Stemle | D21/699 |
| D607,075 S | 12/2009 | McDonanld | |
| D612,002 S * | 3/2010 | Richard | D21/699 |
| 7,762,912 B2 * | 7/2010 | Lewis | 473/454 |
| 7,907,305 B2 * | 3/2011 | Malik et al. | 358/1.9 |
| 7,956,893 B2 | 6/2011 | Lee et al. | |
| D643,888 S * | 8/2011 | Essex | D21/699 |
| 8,182,372 B2 | 5/2012 | Hayes | |
| 8,328,665 B2 | 12/2012 | Meltzer et al. | |
| 8,333,670 B2 | 12/2012 | Ono | |
| 8,376,852 B2 * | 2/2013 | Kao | 463/36 |
| 8,535,180 B1 * | 9/2013 | Husband | 473/422 |
| 8,568,254 B2 * | 10/2013 | Keller | 473/417 |
| 2002/0049103 A1 | 4/2002 | Treihart | |
| 2002/0081002 A1 | 6/2002 | Lee et al. | |
| 2004/0005942 A1 | 1/2004 | Wang | |
| 2004/0162166 A1 * | 8/2004 | Tien | 473/454 |
| 2005/0137035 A1 * | 6/2005 | Huang et al. | 473/454 |
| 2006/0211524 A1 | 9/2006 | Balingit | |
| 2007/0054757 A1 | 3/2007 | Will | |
| 2007/0135240 A1 | 6/2007 | Carr | |
| 2008/0293521 A1 * | 11/2008 | Bishop | 473/456 |
| 2009/0286631 A1 | 11/2009 | Hammons | |
| 2010/0001470 A1 * | 1/2010 | Corrington | 273/348 |
| 2010/0081513 A1 | 4/2010 | La Pointe | |
| 2012/0010028 A1 | 1/2012 | Hammons | |
| 2012/0052989 A1 | 3/2012 | Bishop | |
| 2012/0065003 A1 | 3/2012 | Trout | |
| 2012/0068412 A1 * | 3/2012 | Diercks | 273/407 |
| 2012/0142455 A1 | 6/2012 | Smart | |
| 2012/0172156 A1 | 7/2012 | Schumann | |
| 2013/0157788 A1 * | 6/2013 | Moore | 473/455 |
| 2014/0008870 A1 * | 1/2014 | Jensen | 273/348 |

* cited by examiner

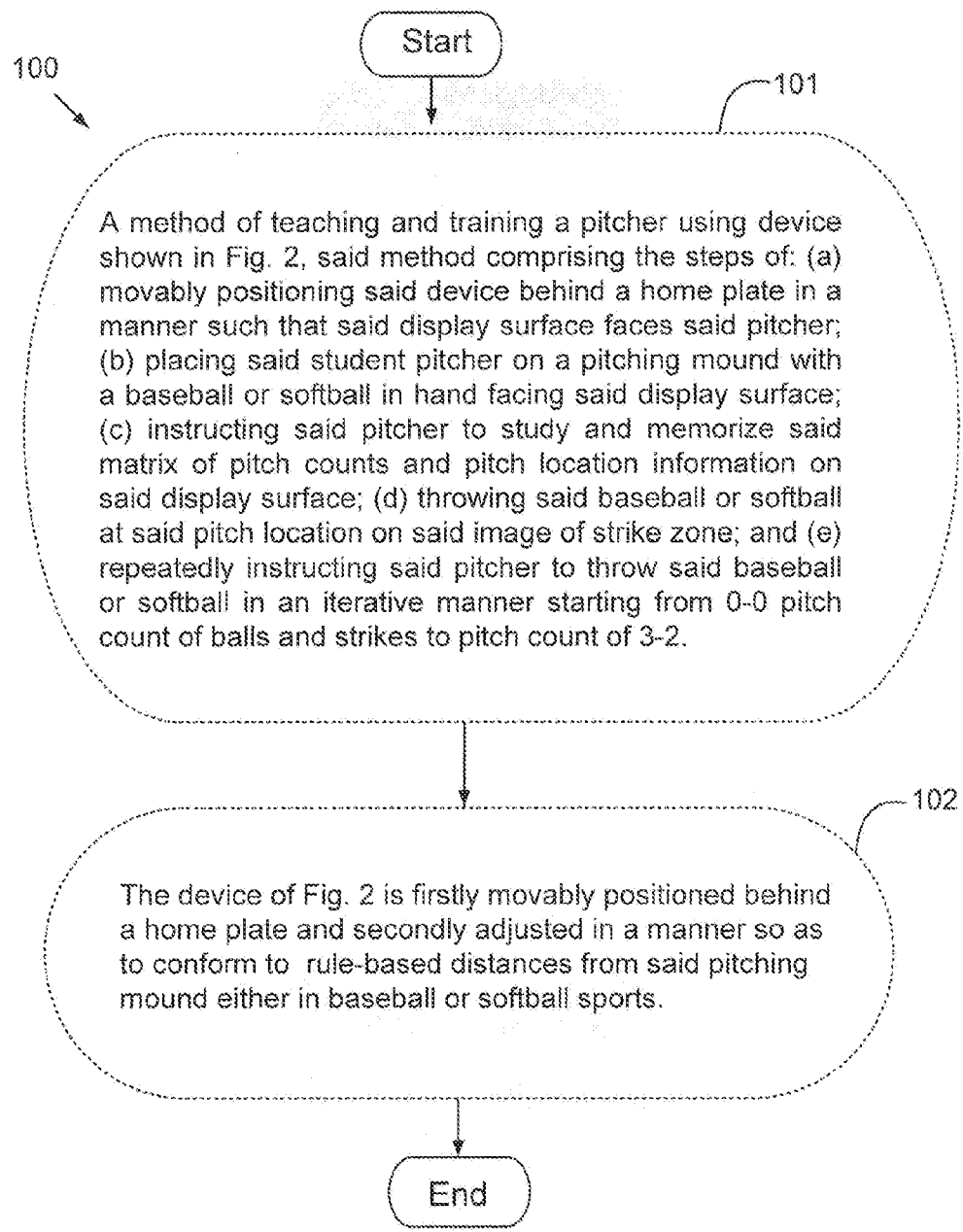

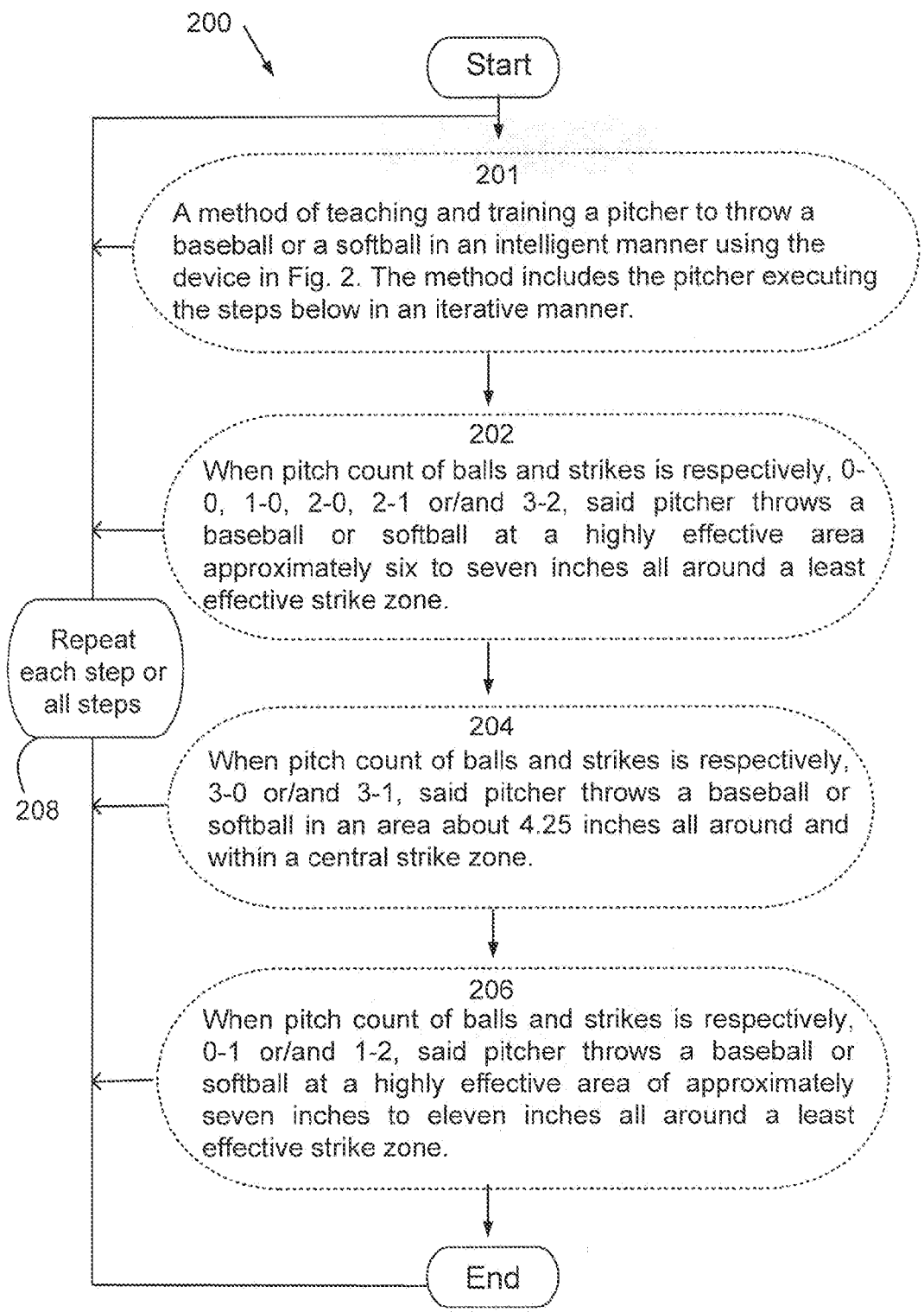

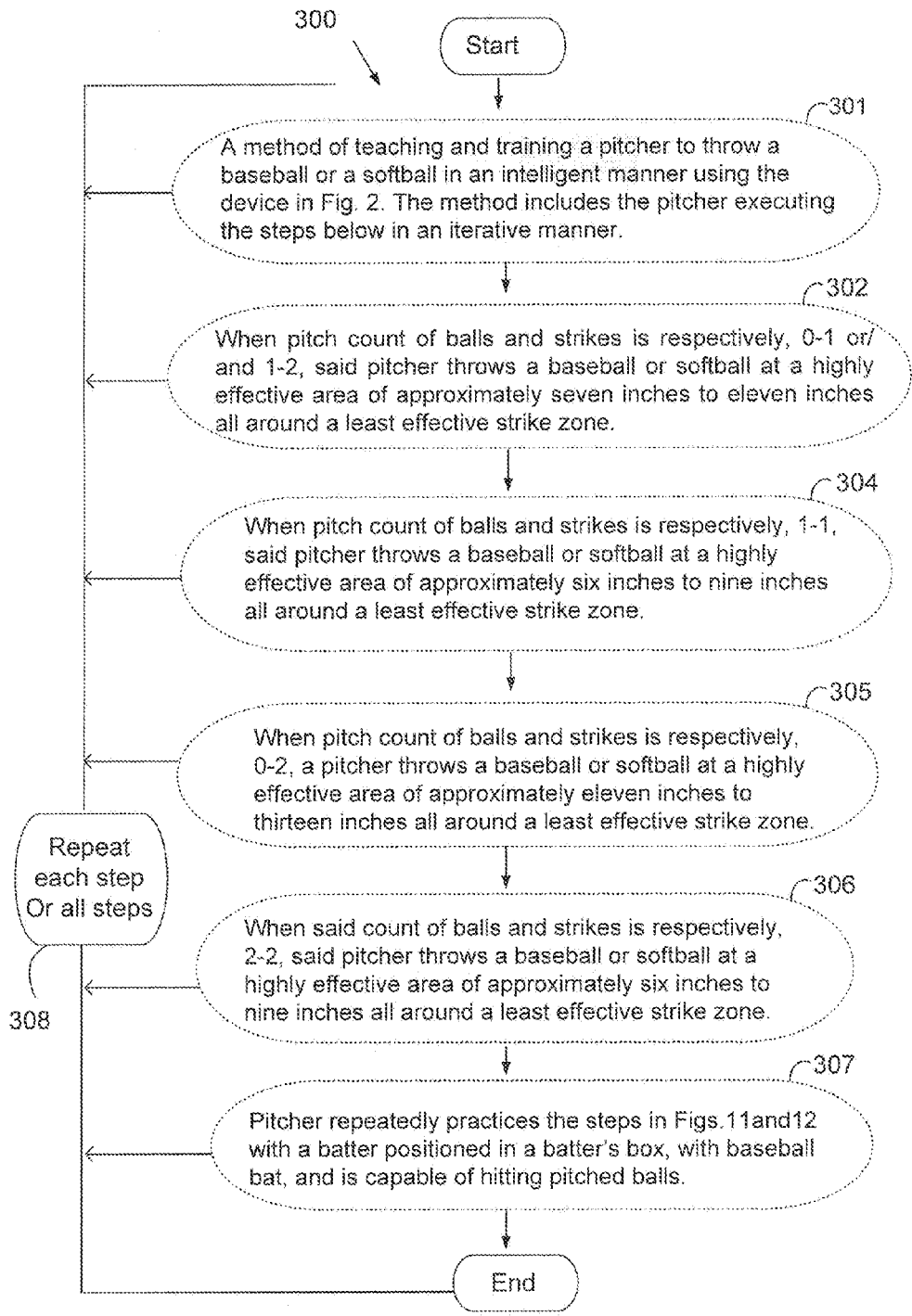

PITCHING DEVICE AND METHOD FOR BASEBALL AND SOFTBALL SPORTS

BACKGROUND OF THE INVENTION

1. Technical Field

The present application relates, in general, to devices, methods and systems for teaching the art of pitching in baseball and softball sports, and more particularly the disclosure relates to the technique of pitching using intelligent information provided as to pitch location that is based on pitch count of "balls and strikes".

2. Description of Some Prior Art

Baseball and softball sports are played by pitching (throwing) a ball to a catcher while a batter attempts to hit the ball with a bat. An umpire is typically positioned behind a home plate and behind a catcher. The umpire observes the travel trajectory of the pitched ball relative to an imaginary "strike zone" the dimensions of which correspond to the width of a home plate (about seventeen inches across). However, the actual "strike zone" may vary, among other things, depending on the umpire's particular predilections and training. One important strategy for pitching in baseball or softball is to "paint" or "nibble" the edges of a strike zone in order to induce a batter to swig at a crucial pitch count such as a "3-2" count (three balls and two strikes as described in common baseball or softball parlance). Here for instance, the purpose of the pitcher is to get a batter to swing at a pitch that is barely outside the strike zone without giving up a "run" or a "hit". Alternatively, the pitcher pitches the ball in such a manner as to put the ball in play so that it would not result in a run scored. Those skilled in the art recognize that a number of methods for teaching student pitchers the fine art of pitching to a batter to minimize the chances of a batter actually hitting the ball that would result in a run or a hit. There have been many U.S. Patents that purport to teach "target" practice for pitching a ball. However, most disclosures and teaching methods have a common limitation, viz, the lack of association of pitch-count with pitch location in a strike zone. For example, U.S. Pat. No. 4,210,326 discloses a portable target apparatus that includes a variable size aperture for a baseball pitcher and a net which comprises a catcher or a stop for the balls which are pitched through the selectively variable target area. The size of the target aperture area can be varied by horizontally and vertically movable straps which are mounted on the target frame structure.

U.S. Pat. No. 4,497,485 discloses a baseball pitching target comprising a rectangular peripheral tubular frame supported by support members staked to the ground. The apparatus has a mesh backstop with a representation of target indicia as the catcher's chest protector, shoulder pads and knee protector pads and mitt. Pitched balls are collected in a compartmentalized ball receiving bag except for those pitched balls that miss the strike zone. Those missing the strike zone will be projected back toward the pitcher by the action of the spring-mesh structure of the backstop.

U.S. Pat. No. 7,762,912 discloses a method and an apparatus that can be configured to receive pitches thrown into a specific designated area of the strike zone and to reject pitches not thrown to the specific designated area. The apparatus alters the position of the strike zone to compensate for the positioning of a catcher behind home plate. The apparatus more accurately identifies the strike zone, and areas outside the strike zone, to which a pitcher should practice throwing pitches.

In another example, U.S. Pat. No. 7,399,241 teaches a pitch training system for indicating whether a thrown baseball has passed through a strike zone that includes a zone assembly for detecting a baseball passing through the zone assembly. The zone assembly indicates when the baseball passes through a strike zone as determined by the zone assembly. A backstop is aligned with and positioned a distance from the zone assembly. The backstop intercepts the baseball thrown through the zone assembly.

Thus most of the prior art appears to be focused on improving the accuracy of pitching a ball to a pre-set target. However, as alluded to above, the additional problem of how best to induce a batter to swing at a pitch at any given pitch count, remains. The present disclosure addresses this issue and seeks to solve this problem. The present disclosure is based on the idea of associating pitch count information with a knowledge-based intelligent algorithm of pitch location and pitch selection within an average strike zone.

SUMMARY OF THE INVENTION

In an embodiment, the disclosed invention includes a device for practice pitching a baseball or a softball, comprising a vertically planar display surface having an image and dimensions of an average strike zone, the display surface further comprising, a plurality of areas of generally rectangular target shapes for receiving pitched balls; the generally rectangular target shapes indicating graded locations of effectiveness of pitches; and the device furthermore comprising pitch location and pitch selection information, which is controlled by pitch count of "balls" and "strikes". In a further embodiment, the vertically planar display surface is supported by at least one rigid supporting member and the display surface being movably positioned behind a home plate. In a typical example, but not limited to, the vertically planar display surface may be affixed to a movable or portable platform or frame made from one or more wood or metal articles that hold the surface sufficiently rigid enough to withstand the impact of a pitched baseball or softball. Furthermore, the average strike zone is sectored into a plurality of graded areas of least effectiveness, to moderate effectiveness and to high effectiveness based on pitch locations. The average strike zone is sectored into a plurality of areas which may be color-coded and/or otherwise visibly demarcated using appropriate colors, numericals, alpha-numericals, patterns, textures or combinations thereof and the like.

A device for practice pitching a baseball or a softball, comprises, inter alia, a vertically planar display surface having an image and dimensions of an average strike zone. In an embodiment, the average strike zone is sectored into a central area of twenty-one inch by eight inch zone of a least effective (on most counts) target for pitch location based on the likelihood that a pitch delivered to this location would result in a "hit" or a "run", as defined in common baseball or softball parlance. In an another embodiment, the average strike zone is sectored into an area of thirty inch by four-and-a-half inch zones of highly effective pitch location surrounding a least effective central strike zone. In yet another embodiment, the average strike zone is sectored into an area of thirty-nine inch by four-and-a-half inch zone of moderately effective pitch location surrounding a highly effective strike zone.

Herein disclosed is a device for practice pitching a baseball or a softball, that comprises inter alia, pitch location and pitch selection information, which is controlled by pitch count of "balls" and "strikes". In an embodiment, the pitch count of balls and strikes that are respectively, 0-0, 1-0, 2-0, 2-1 or 3-2, are associated with a highly effective pitch location area approximately six to seven inches lateral to a least effective strike zone. In another embodiment, the pitch count of balls and strikes that is respectively, 3-0 or 3-1, is associated with a highly effective pitch location area approximately 4.25 inches lateral to and/or including a central strike zone. In a different embodiment, a pitch count of balls and strikes that is respectively, 0-1 or 1-2, is associated with a highly effective pitch location area of approximately seven inches to eleven inches lateral to a least effective strike zone. In a further embodiment, the pitch count of balls and strikes that is respectively, 1-1 is associated with a highly effective pitch location area of approximately six inches to nine inches lateral to a least effective strike zone. In yet another embodiment, the pitch count of balls and strikes that is respectively, 0-2 is associated with a highly effective pitch location area of approximately eleven inches to thirteen inches lateral to a least effective strike zone. In a further aspect, the pitch count of balls and strikes that is respectively, 2-2, is associated with a highly effective pitch location area of approximately six inches to nine inches lateral to a least effective strike zone.

An aspect of the present disclosure includes a method of teaching and training a student pitcher, the method comprising steps of (1) providing a device having a vertically planar display surface having an image and dimensions of an average strike zone, the display surface further comprising, a plurality of areas of generally rectangular target shapes for receiving pitched balls; the generally rectangular target shapes indicating graded locations of effectiveness of pitches; and (2) providing pitch location and pitch selection information, which is controlled by pitch count of "balls" and "strikes". In an embodiment, the vertically planar display surface having an image and dimensions of an average strike zone is firstly positioned behind a home plate and secondly adjusted in manner as to conform to regulation distances in either baseball or softball sports. Furthermore, when the pitch count of balls and strikes is respectively, 0-0, 1-0, 2-0, 2-1, or 3-2, the student pitcher throws a baseball or softball at a highly effective area approximately six to seven inches lateral to a least effective strike zone. In an embodiment, when said pitch count of balls and strikes is respectively, 3-0 or 3-1, the student pitcher throws a baseball or softball at a highly effective area approximately 4.25 inches lateral to and/or including within a central strike zone. In an embodiment, when the pitch count of balls and strikes is respectively, 0-1 or 1-2, the student pitcher throws a baseball or softball at a highly effective area of approximately seven inches to eleven inches lateral to a least effective strike zone. In yet another embodiment, when the count of balls and strikes is respectively, 1-1, the student pitcher throws a baseball or softball at a highly effective area of approximately six inches to nine inches lateral to a least effective strike zone. In a further embodiment, when the count of balls and strikes is respectively, 0-2 the student pitcher throws a baseball or softball at a highly effective area of approximately eleven inches to thirteen inches lateral to a least effective strike zone. In a different embodiment, when the count of balls and strikes is respectively, 2-2, the student pitcher throws a baseball or softball at a highly effective area of approximately six inches to nine inches lateral to a least effective strike zone. The method of teaching and training a student pitcher further includes the reiteration and repetition of the entire set of information disclosed above. The student pitcher reiterates the steps in the method until the student pitcher is able to perform the skills taught in this method and he/she fluently throws pitches in a manner as to target the sectored areas by memorizing the association of the pitch count information with the location of the pitches in an average strike zone sans the presence of the device having a vertically planar display surface having an image and dimensions of an average strike zone.

The foregoing summary is illustrative only and is not intended to be in any way limiting. In addition to the illustrative aspects, embodiments, further improved aspects, embodiments, and devices and methods will become apparent by reference to the drawings and the detailed description.

BRIEF DESCRIPTION OF THE DRAWINGS

FIG. 10 is an illustration of a method of providing an exemplary device for practice pitching a baseball or a softball, providing exemplary pitch location information and exemplary information regarding positioning the device.

FIG. 11 is an illustration of a method of providing an exemplary device for practice pitching a baseball or a softball and providing an exemplary pitch count and pitch location information.

FIG. 12 is an illustration of a method of providing an exemplary device for practice pitching a baseball or a softball and providing an exemplary pitch count and pitch location information.

A person skilled in the art will recognize that the drawings are merely illustrative and are not drawn to scale.

DETAILED DESCRIPTION

In the following detailed description, reference is made to the accompanying drawings, which form a part hereof. The illustrative embodiments described in the detailed description, drawings and claims are not meant to be limiting. Other embodiments may be utilized, and other changes may be made, without departing from the spirit, letter or scope of the subject matter presented here.

Figure 1:
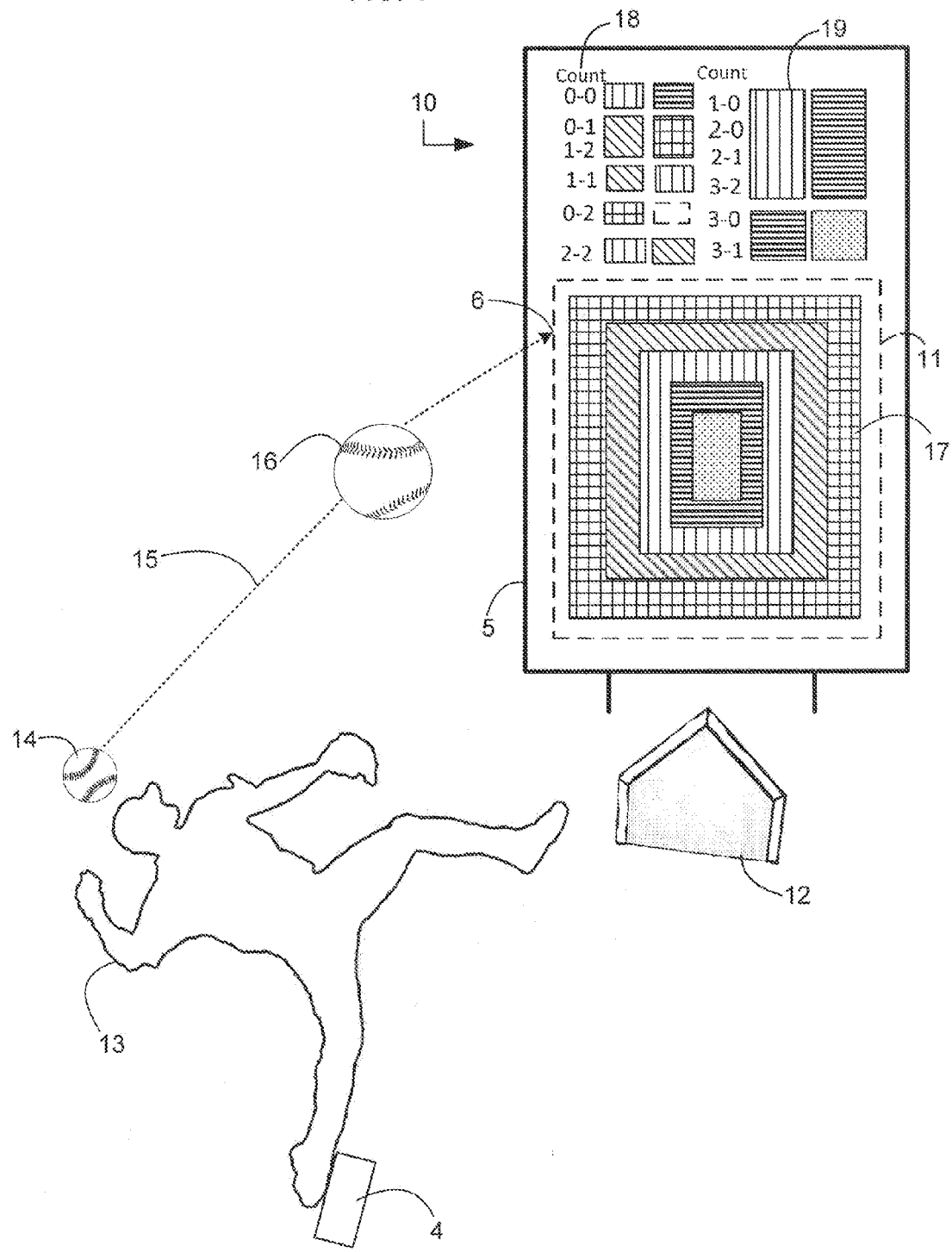
FIG. 1 is a system and method level illustration of an embodiment of a pitching device and methods of its use in an exemplary teaching situation.

The following disclosure is drawn to a device for practice pitching a baseball or a softball and a method for teaching and training a student pitcher. FIG. 1 shows a schematic illustration of an embodiment of the device 10 for practice pitching a baseball or a softball that comprises a vertically planar display surface having an image 11 and dimensions of an average strike zone, the display surface further comprises a plurality of areas of generally rectangular target shapes 17 for receiving pitched balls 16; the generally rectangular target shapes indicate graded locations of effectiveness of pitches; and the device furthermore comprises pitch location information 18, which is controlled by pitch count of "balls" and "strikes" 0-0 to 3-1. FIG. 1 further schematically illustrates a method of teaching and training a student pitcher 13. The method comprises the steps of (1) providing a device 10 having a vertically planar display surface having an image 11 and dimensions of an average strike zone. The display surface further comprises, a plurality of areas of generally rectangular target shapes for receiving pitched balls 16; the generally rectangular target shapes indicating graded locations 17 of effectiveness of pitches; and (2) providing pitch location information 18 and pitch selection information, which is controlled by pitch count of "balls" and "strikes" 0-0 to 3-1. In an embodiment, the device 10 is firstly positioned behind a home plate 12 and secondly adjusted in a manner as to conform to regulation distances in either baseball 14 or softball 16 sports. Those skilled in the art will recognize that the regulation distance may vary depending on the sport: 60 feet 6 inches in base ball and 43 feet in softball, from a pitcher's mound. Thus in an embodiment, the pitching device 10 (FIG. 1) disclosed herein may be movably positioned at a minimum of the above noted distances.

In a further illustrative embodiment, FIG. 1 discloses a device (10) for practice pitching (15) a baseball (14) and a softball (16), comprising: a vertically planar display surface (11) having an image and dimensions representing a strike zone (17); said strike zone further comprises a central rectangular area (20) that represents a least effective pitching zone; said central rectangular area is completely surrounded by four distinct outer rectangular areas (21-24), each outer rectangular area being approximately four and half inches in width; said four distinct outer rectangular areas are concentrically disposed in relative juxtaposition to each other and include distinct indicia for pitch location from high to moderate to low hittability of pitches; said display surface further comprises a matrix of icons (19) representing pitch counts of balls and strikes (18) according to rules of baseball and softball, namely, 0-0, 0-1, 0-2, 1-0, 1-1, 1-2, 2-0, 2-1, 2-2, 3-0, 3-1, and 3-2; said icons and indicia are color-coded; and each said icon for pitch count is directly correlated to said indicia of pitch locations within said rectangular areas of said strike zone.

In yet another embodiment from FIG. 1, a method of using the device (10) of FIG. 1, comprises: (a) at least one rigid supporting frame (5) attached to said device so as to withstand the impact caused by a pitched baseball or softball; (b) said device with said frame is vertically positioned upright behind a home plate (12) such that said device is in-line with a pitcher's mound (4); (c) visibly displaying said matrix of icons (19) of pitch counts (18) and said indicia of pitch locations (17) of said device such that said icons and said indicia are facing a pitcher (13) placed on a pitcher's mound; (d) identifying and designating at least one icon of pitch count and at least one directly correlated indicia of pitch location, thereby defining a target at which a pitcher aims and delivers (15) a baseball (14) or a softball (16) so as to physically contact (6) said target located in said at least one indicia of pitch location; and (e) said physical contact of said baseball or softball with said at least one indicia of pitch location on said device therefrom causes said pitcher to identify and designate a different pitch count than in step (d), whereby said pitcher aims and delivers said baseball or softball at a different target indicia of pitch location than in step (d).

Figure 2:
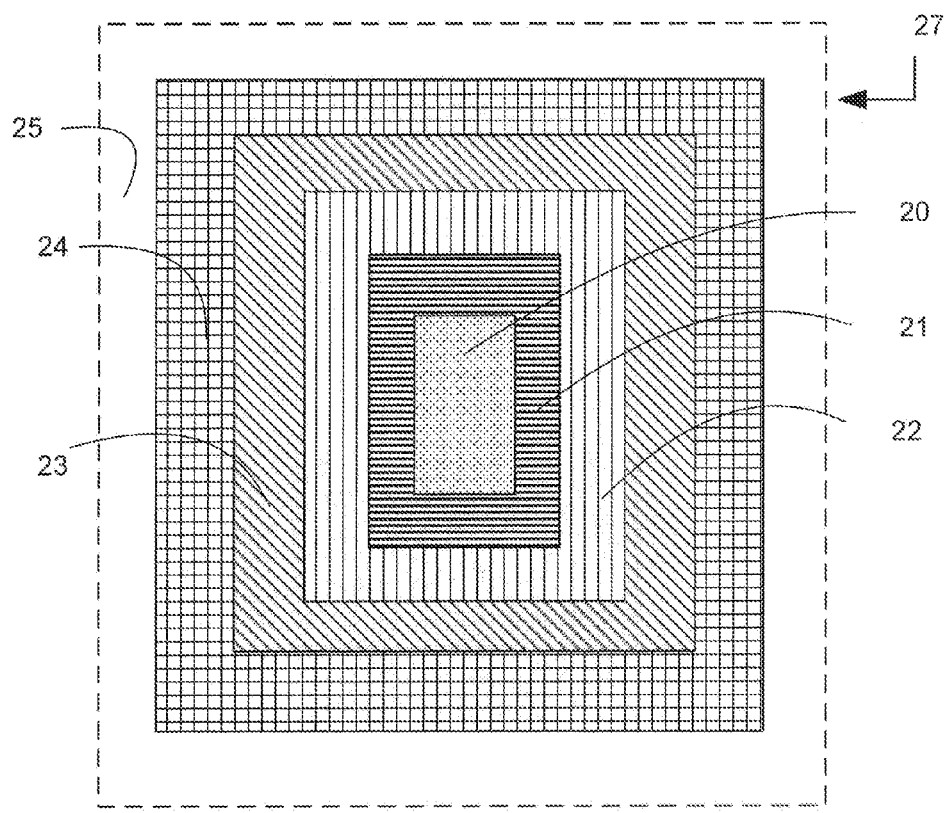
FIG. 2 is an illustrative example of a device for practice pitching a baseball or a softball.

FIG. 2 shows a schematic illustration of an embodiment of a device for practice pitching a baseball or a softball. The device comprises, inter alia, a vertically planar display surface having an image 27 and dimensions of an average strike zone. The display surface further comprises a plurality of areas of generally rectangular target shapes for receiving pitched balls. The generally rectangular target shapes 20, 21, 22, 23, 24 and 25 indicate graded locations of effectiveness of pitches.

The term "average strike zone" includes, but is not limited to, an area of approximately 31 inches by 44 inches in a display surface of the device. This zone is further sectored into a plurality of graded areas of generally rectangular shapes 20-25 with differing areas of least effectiveness, to moderate effectiveness and to high effectiveness based on pitch locations. For example, an area 20 is arbitrarily designated as an area of "least effective" area for a given pitch count based on the likelihood that a baseball or a softball pitch that is delivered in this area will be easily hittable by a batter of reasonable skill in the art of batting. This ordinary batter is expected to swing a bat for a "hit" or a "run" (as used in baseball or softball parlance). However, on a different pitch count the same area may be designated as a moderate or highly effective area for a first choice pitch or a second choice pitch. Thus the terms "least effectiveness" or "least effective" area are context-dependent and in general, fall within a defined area. The least effective area in general, but is not limited to, approximately twenty-one inch by eight inch central zone of a least effective target for pitch location 20. These dimensions correspond to the dimensions of a "home plate". It is generally recognized by those skilled in the art that a home plate is affixed in the ground near a batter's box and the home plate is a five-sided object, which is 17 inches by 8½ inches by 8½ inches by 12 inches by 12 inches, cut to a point at rear. Those skilled in the art recognize that a pitch delivered over the home plate above the waist height of a an ordinary batter would be hittable by a batter of reasonable skill, and that if the batter missed hitting the pitch, the pitch would be called a "strike" by an umpire of ordinary and reasonable skill in the art. Thus as used herein, moderate or highly effective pitch locations disclosed in the device 27, include, but are not limited to areas 20-25 wherein pitches (located in the various figures that follow) are examples of pitches that may be the best locations at a given count but are less likely to be successfully hit by a batter of ordinary skill.

Returning to FIG. 2, the average strike zone is further sectored into an area 21-25, but not limited to, high effectiveness that is approximately thirty nine inches by twelve inches lateral and surrounding the edge of the area designated as a central least effective zone 20. In an embodiment, the areas 21-25 of high to moderate effectiveness are arbitrarily sectored or subdivided. The sectoring scheme illustrated in FIG. 2 is merely for illustrative purposes and is exemplary, but not limited in any way to 3 to 5 generally rectangular shapes 21-25. Those skilled in the art will recognize that other embodiments of the pitching device disclosed herein may be conceived and implemented to fulfill the same or similar purpose in a similar or same way or means in order to achieve the same or similar results. For instance, sectoring schemes that include rectangular or concentric or square shapes are possible. Likewise, color, numerical, alpha-numerical and various texture or pattern schemes may be used separately or in combination with a numerous sectoring schemes to indicate and/or demarcate effective pitch locations. For example, outside the highly effective area, there is defined in FIG. 2 an area 25 of moderate effectiveness, but is not limited to, eleven to thirteen (11-13) inches surrounding and lateral to the least effectiveness area 20. Those skilled in the art will recognize and appreciate that "strike zones" may vary based on the training, volition and personal preferences of umpires. Thus distances and areas presented herein and represented in the drawings should not be construed in any way as limiting.

In the upper portion of FIG. 2, therein is illustratively shown information relating to pitch count and pitch location. In this scheme, pitch location on the pitching display surface is controlled by pitch count of "balls" and "strikes" ranging from 0-0 to 3-2. Each pitch count or groups of balls and strikes are associated with pitch locations. For instance, in an embodiment, in the group consisting of balls and strikes wherein the pitch count is respectively, 0-0, 1-0, 2-0, 2-1 or 3-2, a student pitcher may throw a baseball or softball at a highly effective area represented by the pattern-coded areas of shapes demarcated as 21 and 22. For example, a first choice pitch in this context may be delivered in the area 22, and if the pitcher misses this target, the following second pitch may be delivered to area demarcated as 21, which is much closer to the central area 20. Likewise, in an embodiment, at a pitch count of 0-1 or 1-2 a student pitcher may throw a baseball or softball pitch at a highly effective area of shapes demarcated as 23 and 24. A first choice pitch in this context may be delivered, for example, in the area 23, and if missed the following second pitch may be delivered to area demarcated as 24. In another embodiment, at a pitch count of 1-1 a student pitcher may throw a baseball or softball at a highly effective area shapes demarcated as 23 and 22. A first choice pitch in this context may be delivered, for example, in the area 23, and if missed, the following second pitch may be delivered to area demarcated as 22. In a further embodiment, at a pitch count of 2-2 a student pitcher may throw a baseball or softball at a highly effective area shapes demarcated as 22 and 23. A first choice pitch in this context may be delivered, for example, in the area 22, and if missed, the following second pitch may be delivered to area demarcated as 23. In yet another embodiment, at a pitch count of 0-2 a student pitcher may throw a baseball or softball at a highly effective area shapes demarcated as 24 and 25. A first choice of a pitch in this context may be delivered, for example, in the area 24, and if missed, the following second pitch may be delivered to area demarcated as 25. In another embodiment, at a pitch count of either 3-0 or 3-1 a student pitcher may throw a baseball or softball at a highly effective area shapes demarcated as 21 and 20. A first choice of a pitch in this context may be delivered, for example, in the area 21, and if missed, the following second pitch may be delivered to area demarcated as 20. Other associations between pitch count and pitch locations will be illustrated and discussed in a more detailed manner below.

Figure 3:
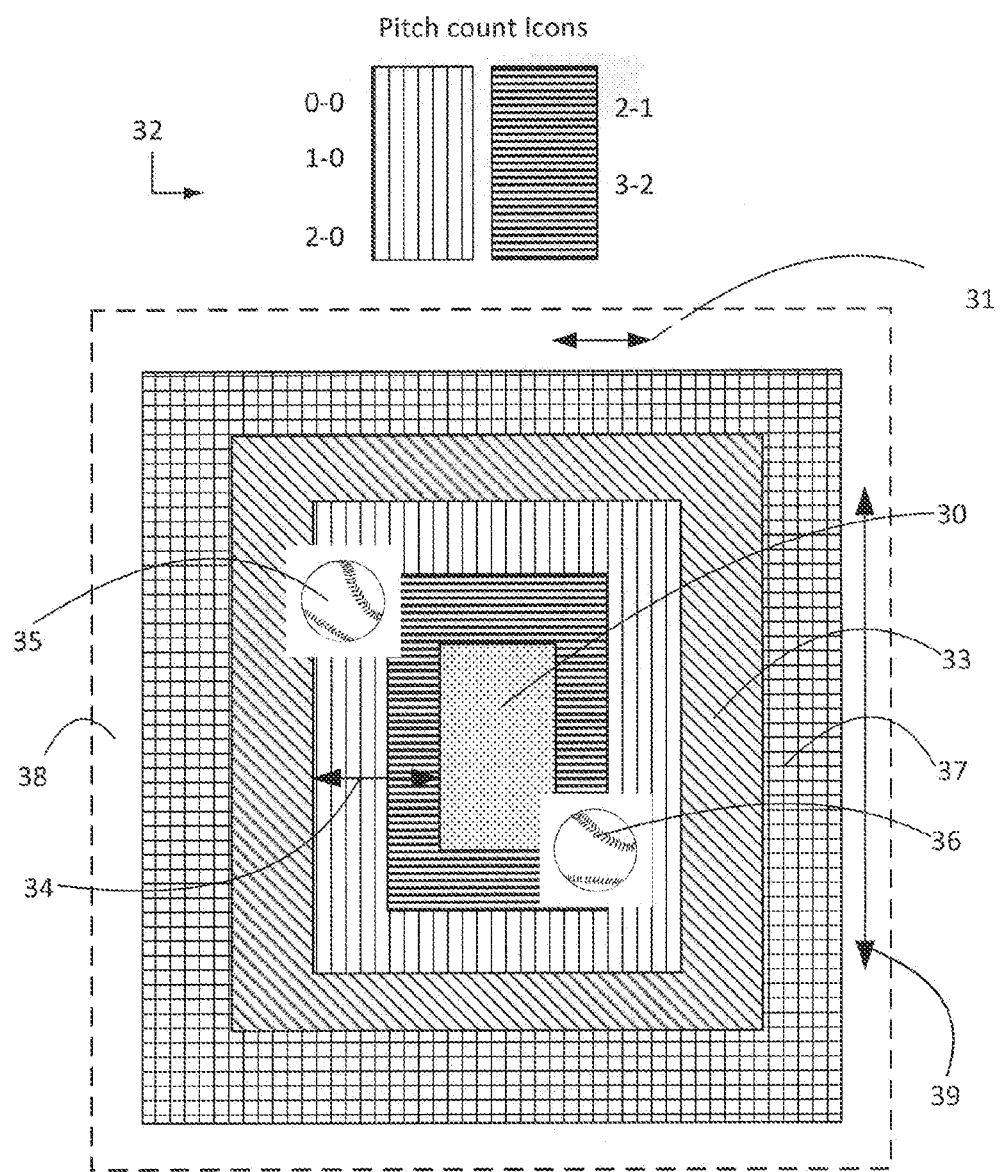
FIG. 3 is an illustration of a device for practice pitching a baseball or a softball exemplifying positions of a softball or baseball on a sectored average strike zone and associations with pitch count information.

In FIG. 3 there is shown an embodiment, wherein a pitch count of balls and strikes 32 that is respectively, 0-0, 1-0, 2-0, 2-1 or 3-2, is associated with a highly effective pitch location area, which is approximately six to seven inches lateral to a least effective strike zone 30. For example, a first choice of a pitch 35 may be delivered at a location as shown, and if missed, the following second pitch 36 may be delivered at a location as shown. An area of about 21.5 inches 31 by 34.5 inches 39 is a highly effective sector for pitching in the above set of counts. The location of the rectangular areas is shown (in FIG. 3) for the location of the pitches. The first choice pitch is about 4.5 inches lateral to the central least effective zone 30 for pitching. The second choice pitch 36 may be located about 4.25 inches lateral to edge of least effective zone 30. Other generally rectangular areas 33, 37 and 38 are not considered highly effective in association with the pitch counts in this group (vide supra). Those skilled in the art will recognize that the 3-2 pitch is a penultimate pitch that a pitcher throws to a batter. Thus there is only one choice for a pitcher on this count-either throwing the ball in the area 35 or 36, but not one followed by the other, as opposed to the other pitch counts 32 in this group.

Figure 4:
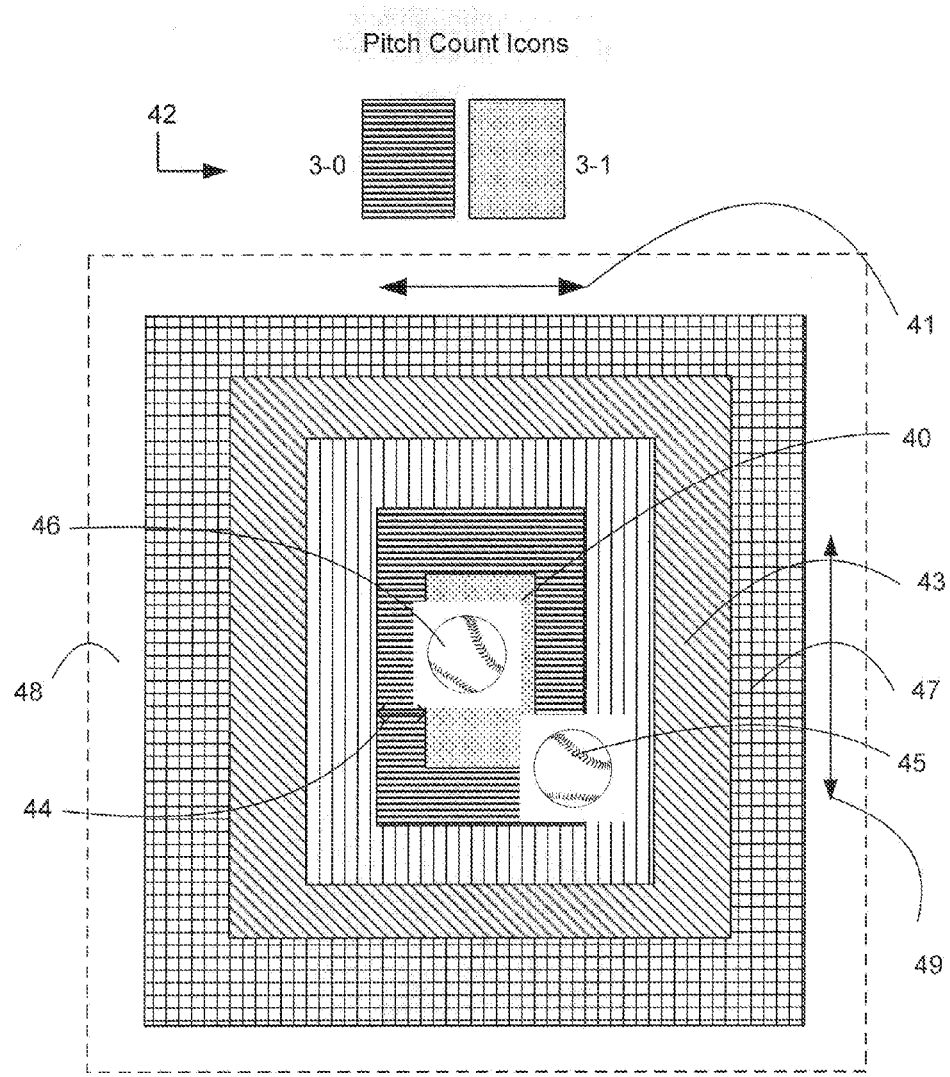
FIG. 4 is an illustration of a device for practice pitching a baseball or a softball exemplifying positions of a softball or baseball on a sectored average strike zone and associations with pitch count information.

FIG. 4 shows an embodiment for a pitch count of balls and strikes 42 that is respectively, 3-0 or 3-1, are associated with a highly effective pitch location area 44 approximately 4.25 inches lateral to an effective strike zone 40. For example, a first choice pitch 45 may be delivered at a location as shown, and if missed, the following second pitch 46 may be delivered at a location as shown in the central part of the strike zone. An area of about 12 inches 41 by 25.5 inches 49 is considered a highly effective sector for pitching in the above noted counts. The approximate width of the rectangular area (45 in FIG. 4) for the location of the pitch is 4.25 inches lateral 46 to the central strike zone 40 for pitching. The second choice pitch 46 may be located within the zone 40. Other generally rectangular areas 43, 47 and 48 are not considered highly effective in association with the pitch counts in this count 42.

Figure 5:
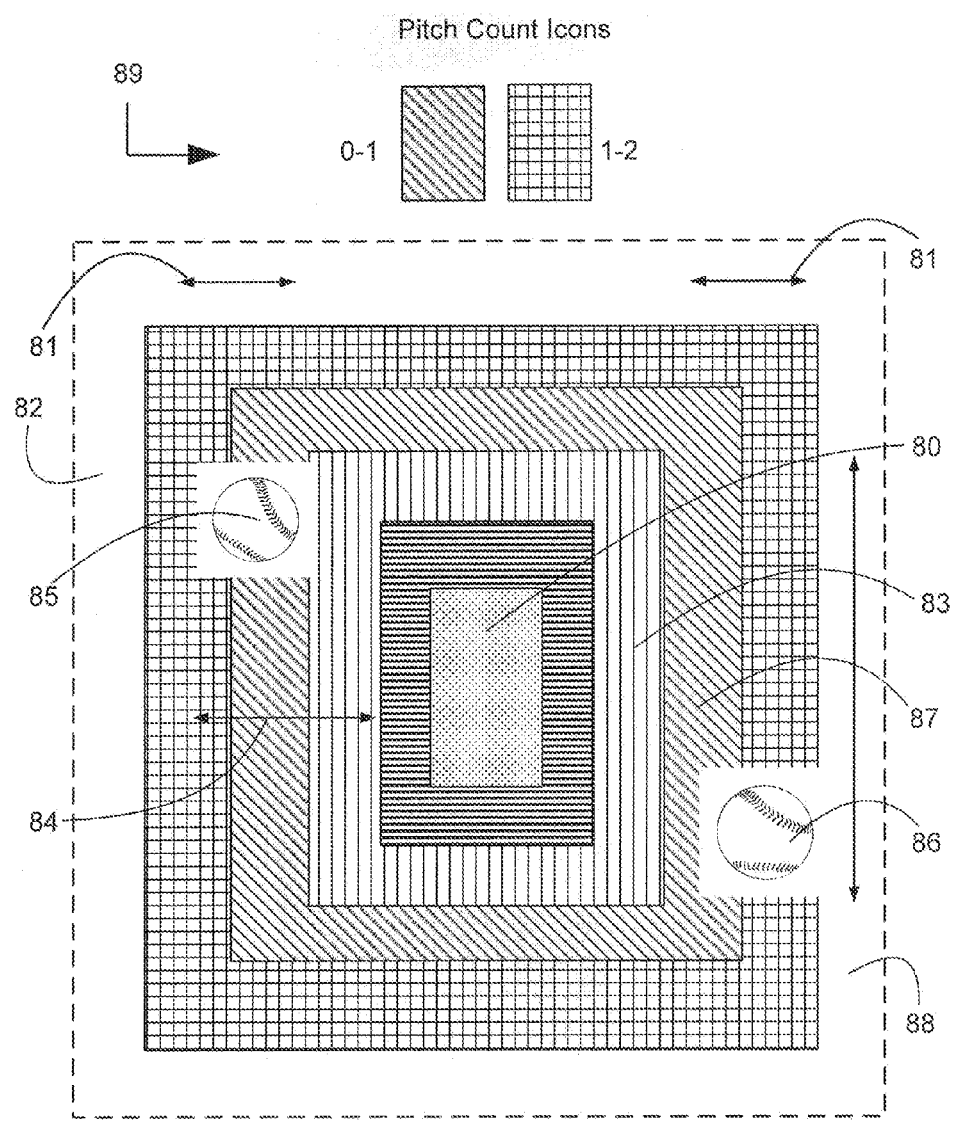
FIG. 5 is an illustration of a device for practice pitching a baseball or a softball exemplifying positions of a softball or baseball on a sectored average strike zone and associations with pitch count information.

In FIG. 5 there is shown an embodiment for a pitch count of balls and strikes that is respectively, 1-1, is associated with a highly effective pitch location area approximately six to nine inches lateral 54 to a least effective strike zone 50. For example, a first choice of a pitch 55 may be delivered at a location as shown, and if missed, the following second pitch 56 may be delivered at a location as shown. An area of about 26 inches 51 by 39 inches 59 is considered a highly effective sector for pitching in the 1-1 count. The approximate width of the rectangular areas (in FIG. 5) for the location of the pitch is 7-9 inches lateral 54 to the central to least effective zone 50 for pitching. The second choice pitch 56 may be located about 7 inches lateral to edge of least effective zone 50. Other generally rectangular areas 52 and 57 are not considered highly effective in association with the pitch counts in the 1-1 count.

Figure 6:
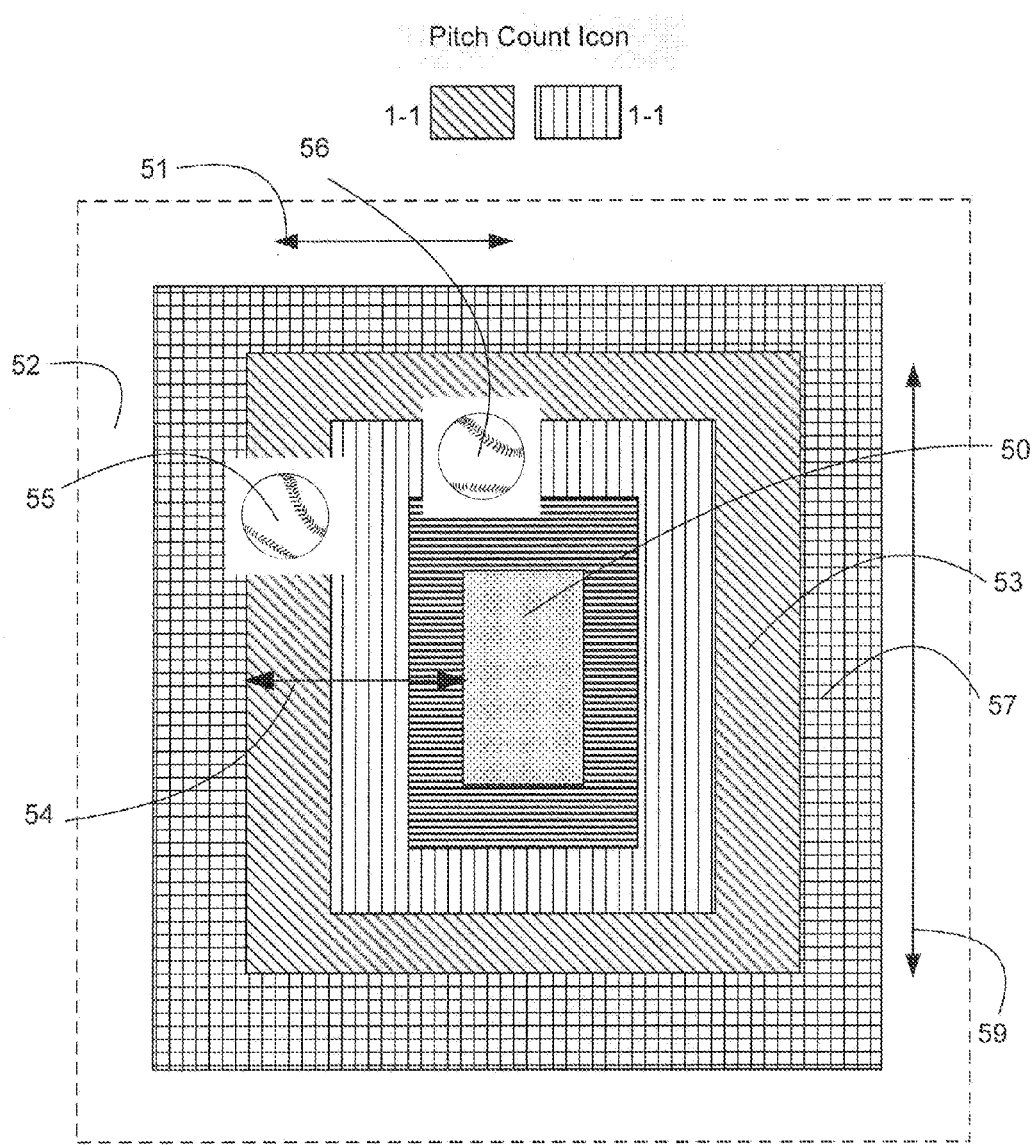
FIG. 6 is an illustration of a device for practice pitching a baseball or a softball exemplifying positions of a softball or baseball on a sectored average strike zone and associations with pitch count information.

FIG. 6 illustrates an embodiment for a pitch count of balls and strikes of respectively, 2-2, which is associated with a highly effective pitch location area approximately six inches to nine inches lateral 64 to a least effective strike zone 60. For example, a first choice of a pitch 65 may be delivered to a location as shown, and if missed, the following second pitch 66 may be delivered at a location as shown. An area of about 26 inches 61 by 39 inches 69 is considered a highly effective sector for pitching in the 2-2 count. The approximate width of the rectangular areas (in FIG. 6) for the location of the pitches is 6-9 inches lateral 64 to the central least effective zone 60 for pitching on 2-2 count. The second choice pitch 66 may be located at least 9 inches lateral 64 to the edge of least effective zone 60. Other generally rectangular areas 60, 62, 63 and 67 are not considered highly effective in association with the pitch count of 2-2.

Figure 7:
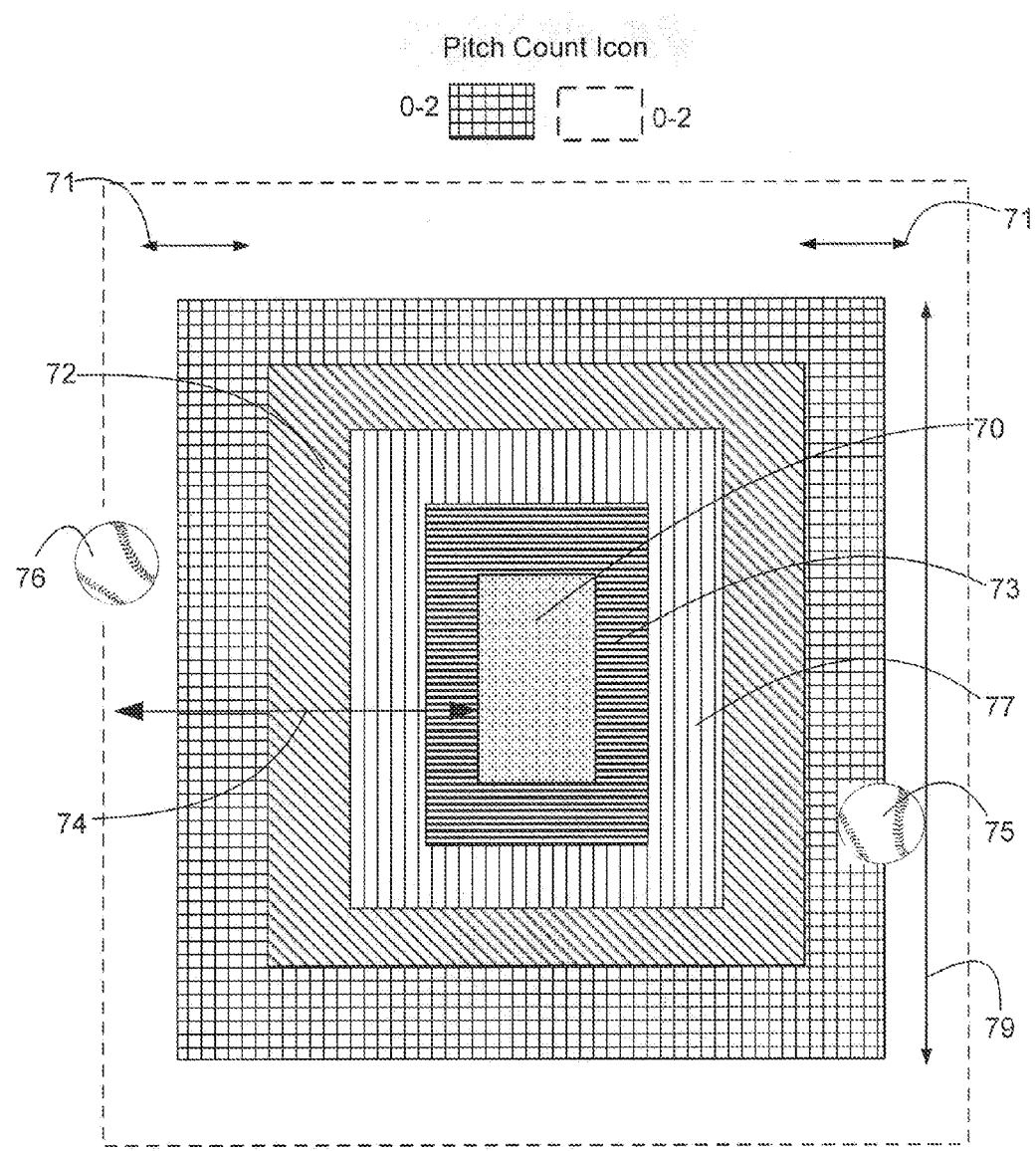
FIG. 7 is an illustration of a device for practice pitching a baseball or a softball exemplifying positions of a softball or baseball on a sectored average strike zone and associations with pitch count information.

In FIG. 7, an embodiment is illustratively shown for a pitch count of balls and strikes that corresponds to respectively, 0-2, which is associated with a highly effective pitch location area approximately 11 inches to 13 inches lateral 74 to a least effective strike zone 60. For example, a first choice pitch 75 may be delivered to a location as shown, and if missed, the following second pitch 76 may be delivered at a location as shown. An area of about 34 inches 71 by 44 inches 79 is considered a highly effective sector for pitching in the 0-2 count. The approximate width of the rectangular areas (in FIG. 7) for the location of the pitch is about 11-13 inches lateral 74 to the central least effective zone 70 for pitching on 0-2 count. The second choice pitch 76 may be located about 13 inches lateral 74 to edge of least effective zone 70. Other generally rectangular areas 72, 73 and 77 are not considered highly effective in association with the pitch count of 0-2.

Figure 8:
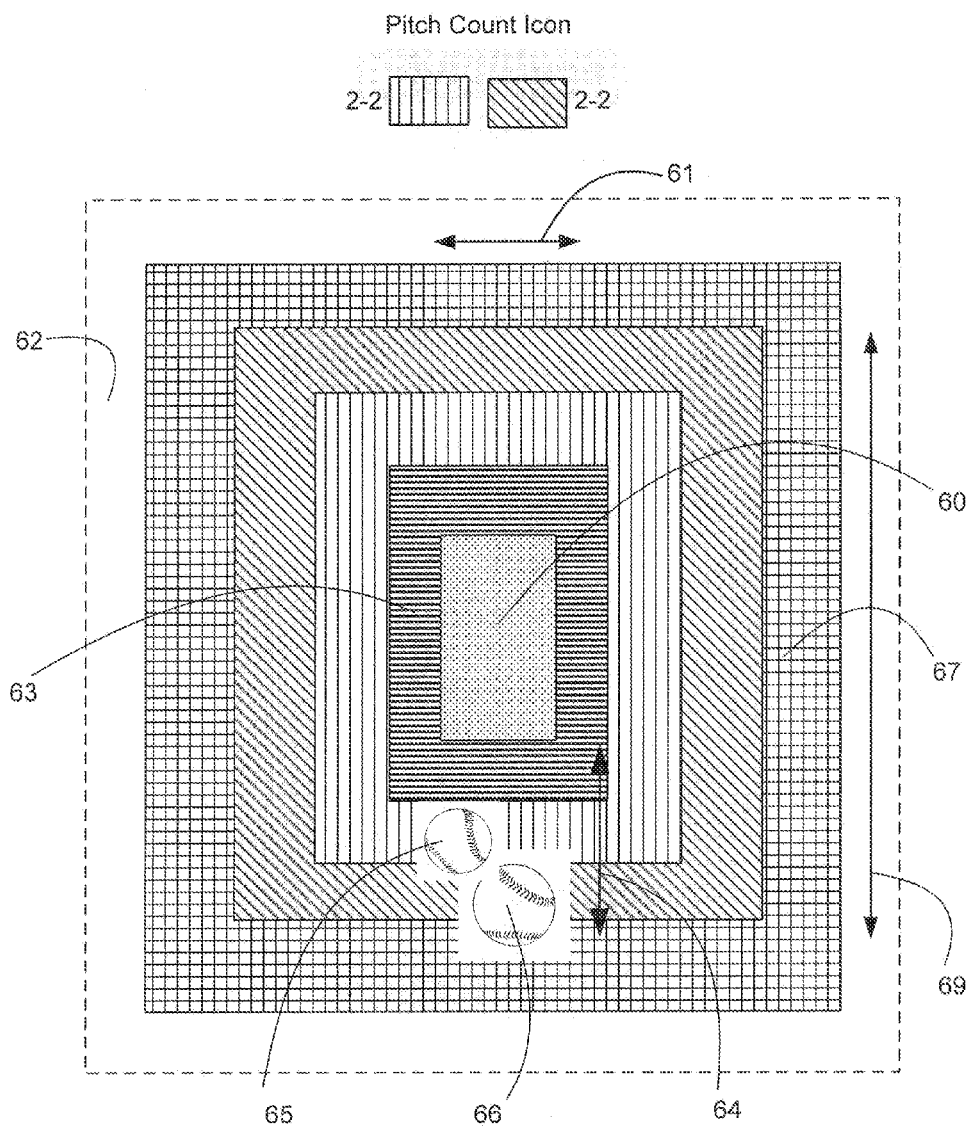
FIG. 8 is an illustration of a device for practice pitching a baseball or a softball exemplifying positions of a softball or baseball on a sectored average strike zone and associations with pitch count information.

In FIG. 8, an embodiment is illustratively shown for a pitch count 89 of balls and strikes that corresponds to respectively, 0-1 or 1-2, which is associated with a highly effective pitch location area approximately 7 inches to 11 inches lateral to a least effective strike zone 80. For example, a first choice pitch 85 may be delivered to a location as shown, and if missed, the following second pitch 86 may be delivered at a location as shown. An area of about 30.5 inches 81 by 43 inches 88 is considered a highly effective sector for pitching in the 0-1 or 1-2 count 89. The approximate width of the rectangular areas (in FIG. 8) for the location of the pitch is about 7-11 inches lateral 84 to the central least effective zone 80 for pitching on 0-1 or 1-2 count. The second choice pitch 86 may be located about 11 inches lateral 84 to edge of least effective zone 80. Other generally rectangular areas 80, 82, and 83 are not considered highly effective in association with this pitch count 89.

Figure 9:
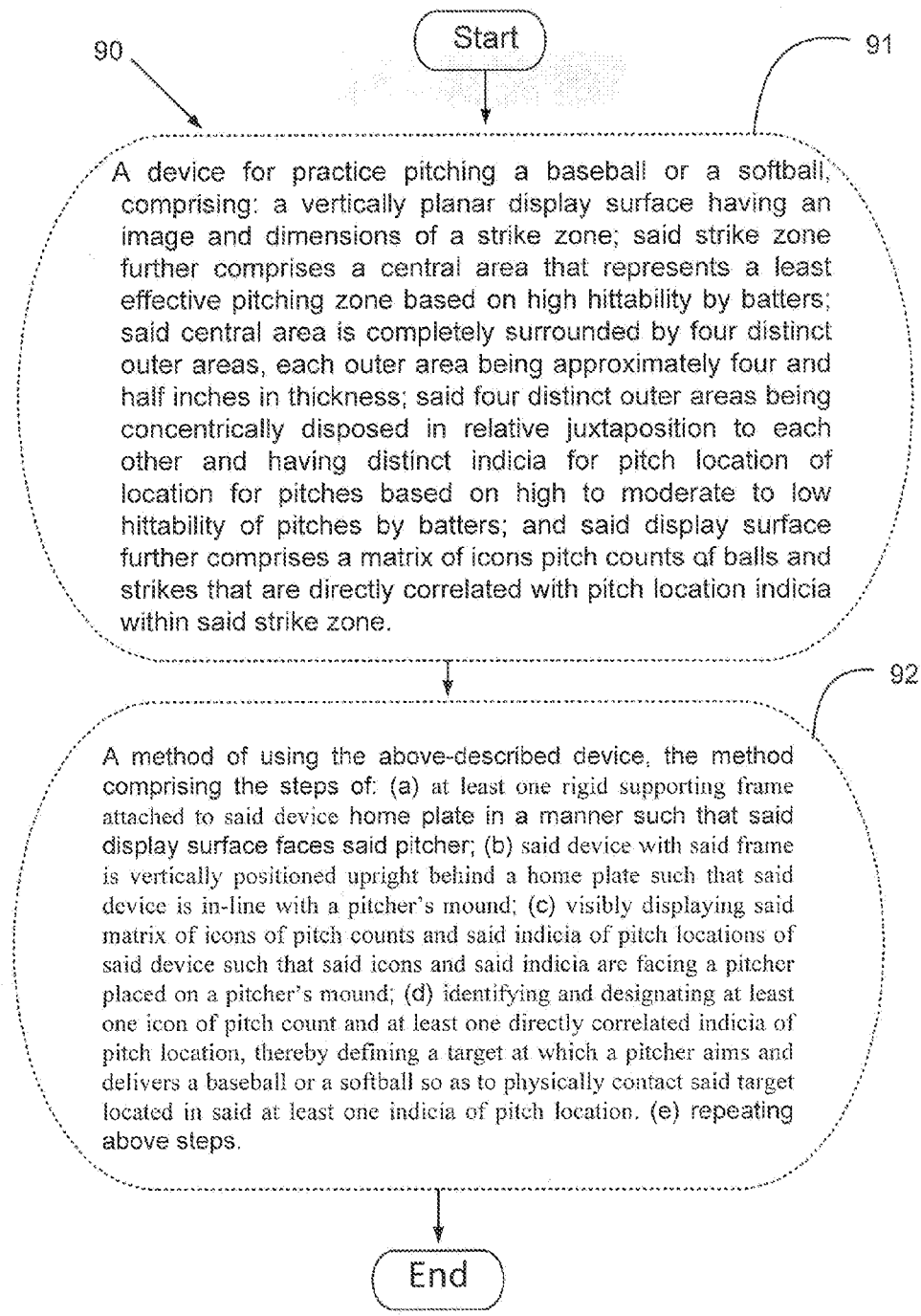
FIG. 9 is an illustration of a method of providing an exemplary device for practice pitching a baseball or a softball and providing an exemplary pitch location information.

Turning now to FIG. 9, which illustrates an embodiment of a method 90 of teaching and training a student pitcher, the method comprises at least two steps: a first step 91 that starts with (1) providing a device having a vertically planar display surface having an image and dimensions of an average strike zone, the display surface further comprising, a plurality of areas of generally rectangular target shapes for receiving pitched balls; the generally rectangular target shapes indicating graded locations of effectiveness of pitches; and a second step 92 of (2) providing pitch location and pitch selection information, which are controlled by pitch count of "balls" and "strikes". In an embodiment, at a minimum, the method ends with the second step as illustrated in FIG. 9.

There is illustrated in FIG. 10 n embodiment of a method 100 that starts with a step 101 of providing a device having a vertically planar a display surface having an image and dimensions of an average strike zone, the display surface further comprising, a plurality of areas of generally rectangular target shapes for receiving pitched balls; the generally rectangular target shapes indicating graded locations of effectiveness of pitches. The methods further includes the step 102 of providing pitch location and pitch selection information, which are controlled by pitch count of "balls" and "strikes". The method 100 further includes the step 103 of providing a vertically planar display surface having an image and dimensions of an average strike zone. The display surface is firstly positioned behind a home plate and is secondly adjusted in a manner to conform to regulation distances in either baseball or softball sports. In an embodiment, at a minimum, the method ends with the third step as illustrated in FIG. 10.

FIG. 11 illustrates an embodiment in which, a method 200 that includes a step 201 of providing pitch location and pitch selection information, which are controlled by pitch count of "balls" and "strikes 201. In an example 202, when a pitch count of balls and strikes is respectively, 0-0, 1-0, 2-0, 2-1 or 3-2, a student pitcher throws a baseball or softball at a highly effective area approximately six inches to seven inches lateral to a least effective strike zone. In an alternative example 204, when a pitch count of balls and strikes is respectively, 1-0, a student pitcher throws a baseball or softball at a highly effective area of approximately seven inches to eleven inches lateral to a least effective strike zone. And in a different example 206, when a count of balls and strikes is respectively, 1-1, a student pitcher throws a baseball or softball at a highly effective area of approximately six inches to nine inches lateral to a least effective strike zone. In an embodiment the method 200 may end with the above steps or the student pitcher may repeat 208 one or more steps disclosed above.

In FIG. 12 there is illustrated a method 300. In an embodiment the method includes a starting step 301 of providing pitch location and pitch selection information, which are controlled by pitch count of "balls" and "strikes". In an example 302, when a count of balls and strikes is respectively, 2-2, a student pitcher throws a baseball or softball at a highly effective area of approximately six inches to nine inches lateral to a least effective strike zone. In an alternative example 303, when a count of balls and strikes is respectively, 0-1 or 1-2, a student pitcher throws a baseball or softball at a highly effective area of approximately seven inches to eleven inches lateral to a least effective strike zone. In a different example 304, when a count of balls and strikes is respectively, 0-2 a student pitcher throws a baseball or softball at a highly effective area of approximately eleven inches to thirteen inches lateral to a least effective strike zone. In yet another example 306, when a count of balls and strikes is respectively, 3-0 or 3-1, a student pitcher throws a baseball or softball at a highly effective area of approximately 4.25 inches lateral to or within a central strike zone. In yet another embodiment, the method 300 may end with the above steps. In an alternative embodiment, a student pitcher reiterates the pitching method 300 as described.

A reasonably skilled artisan will recognize that measurements and distances regarding the placement of the pitches (pitch location) on the device claimed herein vis-à-vis the pitch count is merely illustrative and exemplary. Other variations and alternative pitch locations on the claimed device are within the scope of the claimed invention and may be specified and practiced under the same or similar circumstances. Likewise, those skilled in the art will recognize that the various areas and zones demarcated in the claimed device herein may also be subject suitable alterations, variations and iterations as to shapes, sizes, form a, textures, colors and the like within the scope of the claimed invention.

Those skilled in the art will recognize that the terms "first choice pitch" or "second choice pitch" (or similar terms) are arbitrary for the sake of representations, and are exemplary and illustrative as used herein. The terms are interchangeable and reversible based on the pitch count and the tendencies and proclivities of the batter, for example (first and second locations are reversible). Likewise, the skilled artisan will recognize that a student pitcher may, depending on pitch count inter alia, coalesce or merge the exemplary first and second pitches into one single pitch that may be directed at one location and may be delivered to a second location. Thus the terms are not intended to be limiting in any way.

As used herein, the term "lateral" includes, but is not limited to, connoting, indicating or otherwise describing a location of a pitched ball indicated on the disclosed pitching device herein that is located sideways, left or right or above or below in the average strike zone relative to a central least effective area or zone.

As used herein, the term "central strike zone" includes, but is not limited to, connoting, indicating or otherwise describing a generally rectangular area (For example item 20 in FIG. 2) that is about the size and dimension of a home plate (vide supra).

As used herein, the term "associated" (with reference to a pitch count) includes, but is not limited to, connoting, indicating or otherwise describing a correlation or relationship between a pitch count or a group thereof, with location of a pitch on a vertically planar display surface having an image and dimensions of an average strike zone.

As used herein, the term "pitch location" includes, but is not limited to, a baseball or softball that contacts the disclosed pitching device herein, at a location(s) or sites in the generally rectangular areas as indicated in the various drawings and the accompanying description.

As used herein, the term "pitch selection" includes, but is not limited to any pitch velocity or direction that connotes in baseball or softball parlance at least one or more of the following: fast ball, slow ball, curve ball, slider, knuckler, cut fast ball, slow cut ball, sinker, swinger and/or any other ball that is delivered by a student pitcher with a specific or variable speed or direction.

As used herein, the term "area" includes, but is not limited to, zone, site or location within a sector or within overlapping sectors.

As used herein, the term "generally rectangular" includes, but is not limited to, any rectangular or square shape, that may telescopically adjoin or overlapping surround another rectangular shape. A rectangular shape may be demarcated or otherwise distinguished from another adjoining or surrounding rectangular shape by any means such as a distinct color or numerical or texture or design or pattern or combinations thereof.

The term or phrase "approximately 'X' inches to 'Y' inches lateral to" includes, but is not limited to, distances measured either up or down or crosswise or diagonal from edge of the central rectangular strike zone. The term "lateral to" includes, but is not limited to, horizontal, vertical, diagonal, sideways, left, right, upwards, or downwards from a point of reference. The term "approximately" means just about, nearly, not perfectly accurate but as closely as possible within a margin of error of measurement from point "A" to point "B" on the claimed device.

The foregoing detailed description has set forth various embodiments of devices or methods via the use of examples and drawings. In so far as such drawings and examples comprise one or more devices, steps or methods, it will be understood by those skilled in the art that each component device or method or step within such drawing and example can be implemented, individually and/or collectively, by a wide range of any combination thereof. One skilled in the art will recognize that the herein described methods, protocols or devices or steps and objects and the discussion accompanying them are used as examples for the sake of conceptual clarity and that various methods, modifications are within the skill of those in the art. Consequently, as used herein, the specific examples or embodiments set forth and the accompanying comments and observations are intended to be representative of their more general classes. In general, use of any specific exemplar or embodiment herein is also intended to be representative of its class, and the non-inclusion of such specific steps, examples, embodiments or drawings and examples or the like herein shall not be taken as indicating that limitation is desired. The herein described subject matter sometimes illustrates different devices or methods comprised within, or associated with, different or other device(s) or methods. It is to be understood that such described device or methods, drawings and examples are merely exemplary, and that in fact many other drawings, and examples can be implemented, which achieve the same or similar results. In a conceptual sense, any device or method or protocol to achieve the same result is effectively "equivalent" to this disclosure such that the desired result is achieved. Hence, any two or more devices or methods or steps herein combined to achieve a particular result can be seen as "equivalent" to each other such that the desired result is achieved, irrespective of differences in method(s) or steps. Likewise, any two device(s) so equivalent can also be viewed as being "functionally "equivalent", to each other to achieve a desired result, and any two methods or devices capable of being so associated can also be viewed as being capable of acting together, with each other to achieve a desired result.

With respect to the use of substantially any plural and/or singular terms herein, those having skill in the art can transmute from the plural to the singular and/or from the singular to the plural as is appropriate to the context and/or application. The various singular/plural permutations are not expressly set forth herein for sake of clarity. In a similar vein, with respect to the numerical ranges in the claims and in the specification, those skilled in the art will recognize that a narrow range of numericals may be interpreted as to fall within a broader numerical range. Moreover, the enumerated numerical ranges are merely for illustrative purposes and exemplary only and other variations and ranges are within the scope and breadth of the invention disclosed herein.

While particular aspects of the present subject matter described herein have been shown and described, it will be apparent to those skilled in the art that, based upon the embodiments herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions comprising only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

I claim:

1. A device (10) for practice pitching (15) a baseball (14) and a softball (16), consisting of:
   a vertically planar display surface (11) having an image and dimensions representing a strike zone (17);
   said strike zone further comprises a central rectangular area (20) that represents a least effective pitching zone;
   said central rectangular area is completely surrounded by four distinct outer rectangular areas (21-24), each outer rectangular area being approximately four and half inches in width;
   said four distinct outer rectangular areas are concentrically disposed in relative juxtaposition to each other and include distinct indicia for pitch location from high to moderate to low hittability of pitches;
   said display surface further comprises a matrix of icons (19) representing pitch counts of balls and strikes (18) according to rules of baseball and softball, namely, 0-0, 0-1, 0-2, 1-0, 1-1, 1-2, 2-0, 2-1, 2-2, 3-0, 3-1, and 3-2;
   said icons and indicia are color-coded; and
   each said icon for pitch count is directly correlated to said indicia of pitch locations within said rectangular areas of said strike zone.

2. The device of claim 1, wherein said central rectangular area consists of a pitching zone approximately twenty-one inches long and eight inches wide that is designated as a least effective pitching location.

3. The device of claim 1, wherein an area of approximately thirty inches long and four-and-a-half inches wide is designated as a highly effective pitching zone, which completely surrounds said central rectangular area.

4. The device of claim 1, wherein an area of approximately thirty nine inches long and four-and-a-half inches wide is designated as a moderately effective pitching zone, which completely surrounds a highly effective pitching zone.

5. The device of claim 1, wherein said icons for pitch counts, namely, 0-0, 1-0, 2-0, 2-1 and 3-2, are directly correlated with an indicia of pitch location, which is approximately six to seven inches all around said rectangular central area.

6. The device of claim 1, wherein said icons for pitch counts, namely, 3-0 and 3-1, are directly correlated with an indicia of pitch location, which is approximately 4.25 inches all around said rectangular central area.

7. The device of claim 1, wherein said icons for pitch counts, namely, 0-1 and 1-2, are directly correlated with an indicia of pitch location, which is approximately seven inches to eleven inches all around said rectangular central area.

8. The device of claim 1, wherein said icons for pitch counts, namely, 1-1, are directly correlated with an indicia of pitch location, which is approximately six inches to nine inches all around said rectangular central area.

9. The device of claim 1, wherein said icons for pitch counts, namely, 0-2, are directly correlated with an indicia of pitch location, which is approximately eleven inches to thirteen inches all around said rectangular central area.

10. The device of claim 1, wherein said icons for pitch counts, namely, 2-2, are directly correlated with an indicia of pitch location, which is approximately six inches to nine inches all around said rectangular central area.

11. A method of using the device (10) of claim 1, consisting of:
    (a) at least one rigid supporting frame (5) attached to said device so as to withstand an impact of a pitched baseball or a softball;
    (b) said device with said frame is vertically positioned upright behind a home plate (12) such that said device is in-line with a pitcher's mound (4);
    (c) visibly displaying said matrix of icons (19) of pitch counts (18) and said indicia of pitch locations (17) of said device such that said icons and said indicia are facing a pitcher (13) placed on a pitcher's mound;
    (d) identifying and designating at least one icon of pitch count and at least one directly correlated indicia of pitch location, thereby defining a target at which a pitcher aims and delivers (15) a baseball (14) or a softball (16) so as to physically contact (6) said target located in said at least one indicia of pitch location; and
    (e) said physical contact of said baseball or softball with said at least one indicia of pitch location on said device therefrom causes said pitcher to identify and designate a different pitch count than in step (d), whereby said pitcher aims and delivers said baseball or softball at a different target indicia of pitch location than in step (d).

12. The method of claim 11, wherein, said identifying and designating of said at least one icon for pitch count of balls and strikes, namely, 0-0, 1-0, 2-0, 2-1 and 3-2 on said device, causes said pitcher to deliver a baseball or softball pitch that physically contacts a target indicia within an area approximately six inches to seven inches all around a central rectangular area, said pitch being graded as a highly effective pitch of low hittability by a batter.

13. The method of claim 11, wherein, said identifying and designating of said at least one icon for pitch count of balls and strikes, namely, 3-0 and 3-1 on said device, causes said pitcher to deliver a baseball or softball pitch that physically contacts a target indicia within an area approximately 4.25 inches all around a central rectangular area, said pitch being graded as a highly effective pitch of low hittability by a batter.

14. The method of claim 11, wherein, said identifying and designating of said at least one icon for pitch count of balls and strikes, namely, 0-1 and 1-2 on said device, causes said pitcher to deliver a baseball or softball pitch that physically contacts a target indicia within an area approximately seven inches to eleven inches all around a central rectangular area, said pitch being graded as a highly effective pitch of low hittability by a batter.

15. The method of claim 11, wherein, said identifying and designating of said at least one icon for pitch count of balls and strikes, namely, 1-1 on said device, causes said pitcher to deliver a baseball or softball pitch that physically contacts a target indicia within an area approximately six inches to nine inches all around a central rectangular area, said pitch being graded as a highly effective pitch of low hittability by a batter.

16. The method of claim 11, wherein, said identifying and designating of said at least one icon for pitch count of balls and strikes, namely, 0-2 on said device, causes said pitcher to deliver a baseball or softball pitch that physically contacts a target indicia within an area approximately eleven inches to thirteen inches all around a central rectangular area, said pitch being graded as a highly effective pitch of low hittability by a batter.

17. The method of claim 11, wherein, said identifying and designating of said at least one icon for pitch count of balls and strikes, namely, 2-2 on said device, causes said pitcher to deliver a baseball or softball pitch that physically contacts a target indicia within an area approximately six inches to nine inches all around a central rectangular area, said pitch being graded as a highly effective pitch of low hittability by a batter.

18. The method of claim 11, wherein said pitcher repeats steps in claims 11 through 17 to attain baseball and soft ball pitching accuracy on said device.

* * * * *